United States Patent
Boorse et al.

(10) Patent No.: US 8,246,922 B2
(45) Date of Patent: Aug. 21, 2012

(54) FOUR-WAY DIESEL CATALYSTS AND METHODS OF USE

(75) Inventors: R. Samuel Boorse, Skillman, NJ (US); Martin Dieterle, Jersey City, NJ (US)

(73) Assignee: BASF Corporation, Florham Park, NJ (US)

( * ) Notice: Subject to any disclaimer, the term of this patent is extended or adjusted under 35 U.S.C. 154(b) by 127 days.

(21) Appl. No.: 12/572,730

(22) Filed: Oct. 2, 2009

(65) Prior Publication Data

US 2011/0078997 A1    Apr. 7, 2011

(51) Int. Cl.
  *B01D 53/00* (2006.01)
  *B01J 8/00* (2006.01)
  *B01J 23/00* (2006.01)
  *B01J 37/00* (2006.01)
  *B01J 29/00* (2006.01)
  *C01B 21/00* (2006.01)

(52) U.S. Cl. ........ 423/213.2; 423/213.5; 423/213.7; 423/239.1; 423/239.2; 423/245.1; 423/246; 423/247; 422/170; 422/177; 422/180; 502/66; 502/74; 502/327; 502/332; 502/333; 502/334; 502/339; 502/355; 502/415; 502/439

(58) Field of Classification Search .......... 422/170, 422/177, 180; 502/327, 332, 333, 334, 339, 502/355, 415, 439; 423/213.2, 213.5, 213.7, 423/239.1, 239.2, 245.1, 246, 247
See application file for complete search history.

(56) References Cited

U.S. PATENT DOCUMENTS

| | | | |
|---|---|---|---|
| 4,329,162 A | 5/1982 | Pitcher, Jr. | |
| 4,961,917 A | 10/1990 | Byrne | |
| 4,963,332 A | 10/1990 | Brand et al. | |
| 5,516,497 A | 5/1996 | Speronello et al. | |
| 5,522,218 A | 6/1996 | Lane et al. | |
| 6,415,602 B1 | 7/2002 | Patahett et al. | |
| 6,753,294 B1 | 6/2004 | Brisley et al. | |
| 7,097,817 B2 | 8/2006 | Brisley et al. | |
| 7,119,044 B2 * | 10/2006 | Wei et al. | 502/300 |
| 7,229,597 B2 | 6/2007 | Patchett et al. | |
| 7,481,983 B2 | 1/2009 | Patchett et al. | |
| 7,722,829 B2 * | 5/2010 | Punke et al. | 422/180 |
| 7,902,107 B2 * | 3/2011 | Patchett et al. | 502/74 |
| 8,038,954 B2 * | 10/2011 | Li | 422/180 |
| 2004/0175315 A1 * | 9/2004 | Brisley et al. | 423/239.1 |
| 2007/0110650 A1 | 5/2007 | Pfeifer et al. | |
| 2007/0137184 A1 * | 6/2007 | Patchett et al. | 60/286 |
| 2008/0044319 A1 | 2/2008 | Takahashi et al. | |
| 2009/0255241 A1 * | 10/2009 | Patchett et al. | 60/301 |

FOREIGN PATENT DOCUMENTS

| WO | WO-01/12320 A1 | 2/2001 |
|---|---|---|
| WO | WO-2008/101585 A1 | 1/2008 |
| WO | WO-2009/080152 A1 | 7/2009 |

* cited by examiner

*Primary Examiner* — Cam N. Nguyen
(74) *Attorney, Agent, or Firm* — Scott S. Serrilla; Diehl Serrilla LLC; Melanie L. Brown

(57) ABSTRACT

Provided are catalyst articles, emission treatment systems and methods for simultaneously remediating the carbon monoxide, nitrogen oxides (NOx), particulate matter, and gaseous hydrocarbons present in diesel engine exhaust streams. The emission treatment system of specific embodiment effectively treats diesel engine exhaust with a single catalyst article.

26 Claims, 3 Drawing Sheets

FOUR-WAY DIESEL CATALYSTS AND METHODS OF USE

BACKGROUND

The present invention relates to catalyst articles, emission treatment systems and methods of treating exhaust gas. Specifically, embodiments of the invention relate to four-way diesel catalysts and systems which employ such catalyst. Additionally, methods of using and preparing a four-way diesel catalyst are described. Embodiments of the invention provide effective methods of remediating the carbon dioxide, nitrogen oxides (NOx), particulate matter, and gaseous hydrocarbons present in diesel engine exhaust streams.

Diesel engine exhaust is a heterogeneous mixture which contains not only gaseous emissions such as carbon monoxide ("CO"), unburned hydrocarbons ("HC") and nitrogen oxides ("NOx"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way a catalyzed soot filter (CSF) or catalyzed diesel particulate filter (CDPF) is effective in providing for >80% particulate matter reduction along with passive burning of the accumulating soot, and thereby promoting filter regeneration.

Another mechanism for the removal of particles is through the use of $NO_2$ in the exhaust stream as an oxidant. Thus, particulates may be removed by oxidation employing $NO_2$ as an oxidant at temperatures above 300° C. The $NO_2$ already in the exhaust from the engine may additionally be supplemented through oxidation of NO also in the exhaust through the use of an upstream DOC oxidation catalyst. This passive regeneration mechanism can further reduce the soot load in a filter and decrease the number of regeneration cycles.

Future emissions standards adopted throughout the world will also address NOx reductions from diesel exhaust. A proven NOx abatement technology applied to stationary sources with lean exhaust conditions is Selective Catalytic Reduction (SCR). In this process, NOx is reduced with ammonia ($NH_3$) to nitrogen ($N_2$) over a catalyst typically composed of base metals. The technology is capable of NOx reduction greater than 90%, and thus it represents one of the best approaches for achieving aggressive NOx reduction goals. SCR is under development for mobile applications, with urea (typically present in an aqueous solution) as the source of ammonia. SCR provides efficient conversions of NOx as long as the exhaust temperature is within the active temperature range of the catalyst.

While separate substrates each containing catalysts to address discrete components of the exhaust can be provided in an exhaust system, use of fewer substrates is desirable to reduce the overall size of the system, to ease the assembly of the system, and to reduce the overall cost of the system. One approach to achieve this goal is to coat the soot filter with a catalyst composition effective for the conversion of NOx to innocuous components. With this approach, the SCR catalyzed soot filter assumes two catalyst functions: removal of the particulate component of the exhaust stream and conversion of the NOx component of the exhaust stream to $N_2$.

Coated soot filters that can achieve NOx reduction goals require a sufficient loading of SCR catalyst composition on the soot filter. The gradual loss of the catalytic effectiveness of the compositions that occurs over time through exposure to certain deleterious components of the exhaust stream augments the need for higher catalyst loadings of the SCR catalyst composition. However, preparation of coated soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures are therefore desirable.

An additional aspect for consideration in coating the wall flow filter is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often leads to temperatures above 700° C. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the NOx component of the exhaust to achieve NOx reduction goals, even at lower exhaust temperatures.

International patent application publication WO 2008/101585 shows a catalyst configuration where the oxidative function catalyst is dispersed along the entire length of the filter but only across half of the cross-section of the wall. (See FIGS. 3 and 4 of the published application.) The SCR catalyst is either placed on the wall in a zone at the front of the filter or in the wall along the length of the filter but only through half of the filter cross-section with the remainder of the wall filled with oxidation catalyst. The first configuration suffers from the possibility of the bypass of gas around the SCR catalyst (since the gas flow is not forced through the SCR layer) and can result in passage of NOx through the filter untreated and further the oxidation of $NH_3$ to NOx. Additionally, both configurations suffer from the possibility of increased backpressure since the volume of SCR catalyst is presumed from experience to be higher than the volume of the oxidation catalyst. This configuration restricts the SCR catalyst to a smaller portion of the wall and results in higher backpressure as the catalyst either fills a greater percentage of the pore volume in the wall cross-section or creates a restriction to flow in the inlet channels.

There remains a need in the art for catalyst articles, methods and systems to treat the carbon monoxide, nitrogen oxides hydrocarbons and particulate matter from a diesel engine in an effective and inexpensive manner without occupying significant space.

SUMMARY

Embodiments of the invention are directed to four-way catalysts for diesel exhaust. As the name implies, all four of the main emissions in the exhaust—CO, HC, NOx and soot—are removed in a single component or a single housed components. In order to remove soot, the four way component substrate is a filter or has filtration capabilities. For catalyst coatings on a filter, two considerations are backpressure minimization and prevention of bypass of the exhaust around the catalyst disposed in the filter. The minimization of backpressure translates directly into fuel savings and potentially engine life as well. The prevention of exhaust gas bypass around catalyst(s) is important to insure the required conversion and, in the extreme case, to prevent the possibility of additional emissions, for instance from the oxidation of $NH_3$ to NOx. Bypass around catalysts is a possibility with filter substrates because of the multiple gas paths available down the channel and across the filter wall.

For a four-way component that uses separate SCR and oxidative catalyst materials to remove NOx by $NH_3$, CO and HC, the exhaust must first pass through the SCR catalyst and then pass across the oxidation catalyst. If the exhaust bypasses the SCR catalyst and is exposed to the oxidation function first, the reductant (e.g. $NH_3$ or hydrocarbons) will be oxidized to NOx and the NOx abatement function will be compromised, even to the point of emitting greater NOx than entered the catalyst when $NH_3$ is used as the reductant.

In an exemplary embodiment of the invention address both the backpressure and gas bypass issues. In some embodiments, the SCR catalyst is disposed throughout the wall of the filter along the entire length and through the whole cross section of the wall. This allows for the maximum volume in the filter pores to spread the SCR catalyst over and thereby minimizes backpressure. The oxidative function catalyst is dispersed on top of the wall of the outlet channel as a zone at the outlet end of the filter. It forms a layer on top of the wall over the SCR catalyst dispersed throughout the wall. The oxidation catalyst can be placed so as to make an impervious zone on the filter wall and thus force the gas to cross the wall in the front of the filter. In an alternate exemplary embodiment, the oxidative catalyst can allow for some gas passage across the wall directly underneath it, provided that there is sufficient SCR catalyst in the wall to remove all of the NOx and $NH_3$ prior to the gas crossing the oxidation catalyst.

One or more embodiments of the invention are directed to catalyst articles comprising a wall flow filter having a plurality of longitudinally extending passages formed by longitudinally extending porous walls bounding and defining the passages and an axial length extending between an inlet end and an outlet end. The passages comprise inlet passages open at the inlet end and closed at the outlet end, and outlet passages being closed at the inlet end and open at the outlet end. An SCR catalyst composition is disposed within the porous walls and an oxidation catalyst is disposed on the walls of the outlet passages extending from the outlet end and less than the axial length of the wall flow filter. In one or more embodiments, a portion of the oxidation catalyst can also penetrate into the filter walls directly below it. In detailed embodiments, the catalyst article further comprises a gas impermeable zone starting at the outlet end and extending partially along the axial length of the wall flow filter. In specific embodiments, the gas impermeable zone is formed by the oxidation catalyst. In some embodiments, the gas impermeable zone is formed from a material which does not react with exhaust gas components. In some embodiments, the gas impermeable zone is formed from a composition comprising alumina and a platinum group metal or any other material capable of the oxidation of HC and CO. In some specific embodiments, the oxidation catalyst is disposed substantially only on the walls of the outlet passages in the gas impermeable zone. In detailed embodiments, the gas impermeable zone extends up to about 70% of the axial length of the wall flow filter. In other detailed embodiments, the gas impermeable zone extends up to about 50% of the axial length of the wall flow filter. In other detailed embodiments, the gas impermeable zone extends up to about 30% of the axial length of the wall flow filter. In other detailed embodiments, the gas impermeable zone extends up to about 10% of the axial length of the wall flow filter.

In detailed embodiments, the SCR catalyst composition extends to the entire axial length of the filter. The SCR catalyst of specific embodiments uniformly permeates the porous walls. In specific embodiments, the porous walls have substantially uniform porosity. In other detailed embodiments, the SCR catalyst permeates the filter walls in a zone that is less than the entire axial length of the filter. The remaining filter wall volume can be filled with an inert material.

In specific embodiments, the catalyst article is effective to remove at least about 70% of the soot from the exhaust stream. In specific embodiments, the catalyst article is effective to remove carbon monoxide, hydrocarbons, nitrogen oxides and soot from an exhaust gas stream from a diesel engine.

Additional embodiments of the invention are directed to methods of treating a lean burn diesel exhaust gas stream including CO, hydrocarbons, NOx and soot. The methods comprise passing the exhaust gas stream through a catalyst article as previously described. In specific embodiments, the catalyst article further comprises a gas impermeable zone extending from the outlet end along the axial length of the wall flow filter.

Further embodiments of the invention are directed to systems for treating exhaust from a lean burn diesel engine. The systems comprise the catalyst article previously described located downstream of the engine. In specific embodiments, the catalyst article further comprises a gas impermeable zone starting from the outlet end and extending along the axial length of the wall flow filter. In detailed embodiments, the system further comprises a urea injector located upstream of the catalyst.

Some embodiments of the invention are directed to methods of treating an exhaust gas stream including CO, hydrocarbons, NOx and soot. The methods comprise passing the exhaust gas stream through a single catalytic article comprising a wall flow filter having an inlet end, an outlet end and an axial length. The wall flow filter includes a first region extending the entire axial length that removes substantially all of the NOx in the exhaust stream and a second region extending from the outlet end of the wall flow filter less than the axial length for oxidizing one or more of CO, hydrocarbons or soot.

Additional embodiments of the invention are directed to catalyst articles for treating an exhaust stream comprising CO, hydrocarbons, NOx and soot. The catalyst article comprises a wall flow filter having an inlet end, an outlet end and an axial length. The wall flow filter includes a first region extending the entire axial length and a second region extending from the outlet end of the wall flow filter for less than the axial length, the first region effective to remove substantially all of the NOx in the exhaust stream and the second region effective to oxidize one or more of the CO, hydrocarbons and soot.

DETAILED DESCRIPTION

Figure 1:
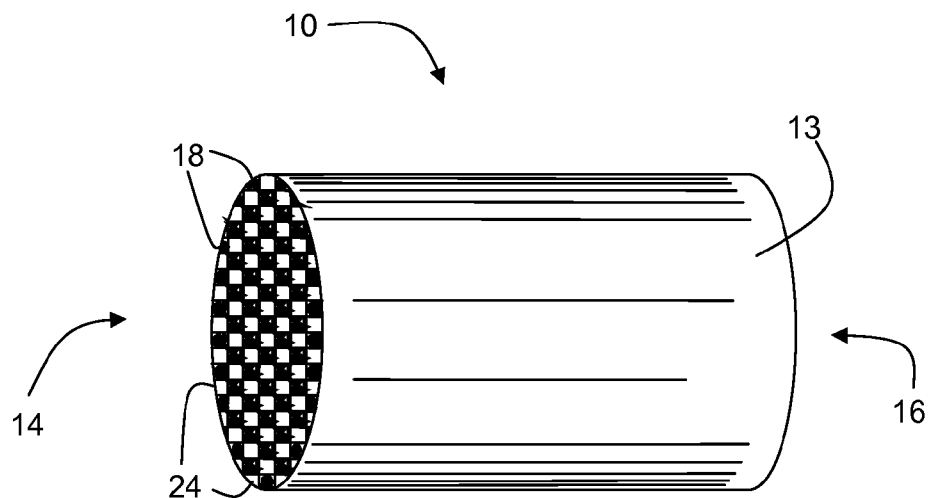
FIG. 1 shows a perspective view of a wall flow filter substrate.

Embodiments of the invention relate to emission treatment systems that effectively provide simultaneous treatment of the particulate matter, the NOx and other gaseous components of diesel engine exhaust. The emission treatment systems use an integrated soot filter and SCR catalyst to significantly minimize the weight and volume required for the emissions system. Moreover, due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles. Additionally, the reduction in exhaust system size also reduces its thermal mass and thus the speed at which it heats up to temperatures at which the catalyst is effective. This results in an increase in the efficiency of the system.

Integration of NOx reduction and particulate removal functions into a single catalyst article is accomplished using a wall flow substrate coated with an SCR catalyst composition. Applicants have found a method for applying an SCR catalyst composition to a wall flow substrate to form a substrate that can be used in an application where high filtration efficiency is required. For instance, a substrate formed with this method is suitable for effectively removing particulate matter (e.g., greater than 80%) in the emission treatment system of an embodiment of the invention. The coating method disclosed herein allows wall flow substrates to be loaded with practical levels of SCR catalyst without causing excessive back pressure across the coated article when implemented in emission treatment systems.

Achieving practical levels of SCR catalyst composition on the wall flow substrate is important for providing sufficient catalytic activity to achieve mandated NOx reduction levels, and for lowering the combustion temperature of the soot fraction trapped on the filter. Achieving adequate levels of SCR washcoat compositions on the soot filter is also important to secure adequate durability for the catalyst. Over extended use of the emission treatment system, catalysts are invariably exposed to various levels of catalyst poisons that may be derived through break down of lubricating oils, or may arise from impurities in the diesel fuel. Examples of such catalyst poisons include phosphorus, zinc, alkali and alkaline earth elements. Higher levels of catalyst compositions are therefore typically deposited on catalyst substrates to overcome the inevitable loss of catalytic activity.

As used herein, substantially all refers to greater than about 95% by weight. In more specific embodiments, substantially all refers to greater than about 99% by weight. As used herein substantially uniform porosity in cross-section refers to porosity that is similar in pore size and distribution throughout the cross-section of the wall. For example, substantially uniform porosity in cross-section would not include a wall structure in which the pore size through the wall cross-section is intentionally varied, for example, where the pores are larger adjacent the inlet surface compared to the pores adjacent the outlet surface.

As used herein, "platinum group metal" refers to platinum group metals or one of their oxides.

Figure 2:
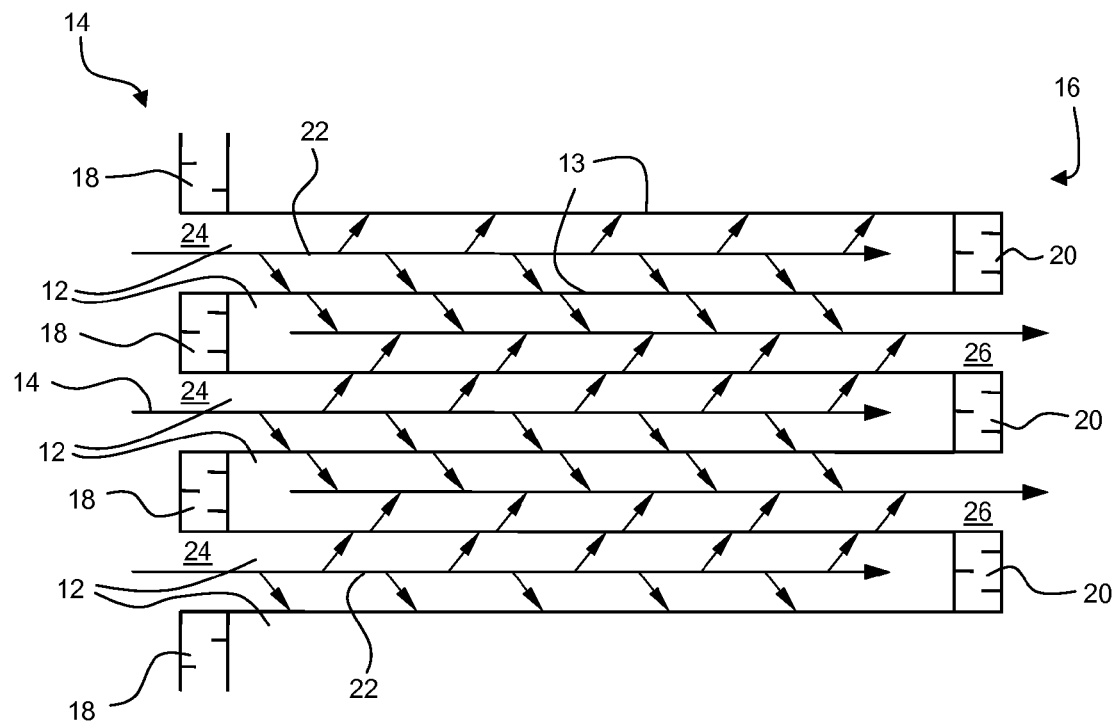
FIG. 2 shows a cutaway view of a section of a wall flow filter substrate.

FIGS. 1 and 2 illustrate a typical wall flow filter substrate 10 (also referred to as a wall flow filter) which has a plurality of passages 12. The passages are tubularly enclosed by the internal walls 13 of the filter substrate. The substrate has an inlet end 14 and an outlet end 16. Alternate passages are plugged at the inlet end with inlet plugs 18, and at the outlet end with outlet plugs 20 to form opposing checkerboard patterns at the inlet 14 and outlet 16. A gas stream 22 enters through the unplugged channel inlet 24, is stopped by outlet plug 20 and diffuses through channel walls 13 (which are porous) to the outlet side 26. The gas cannot pass back to the inlet side of walls because of inlet plugs 18.

Figure 3:
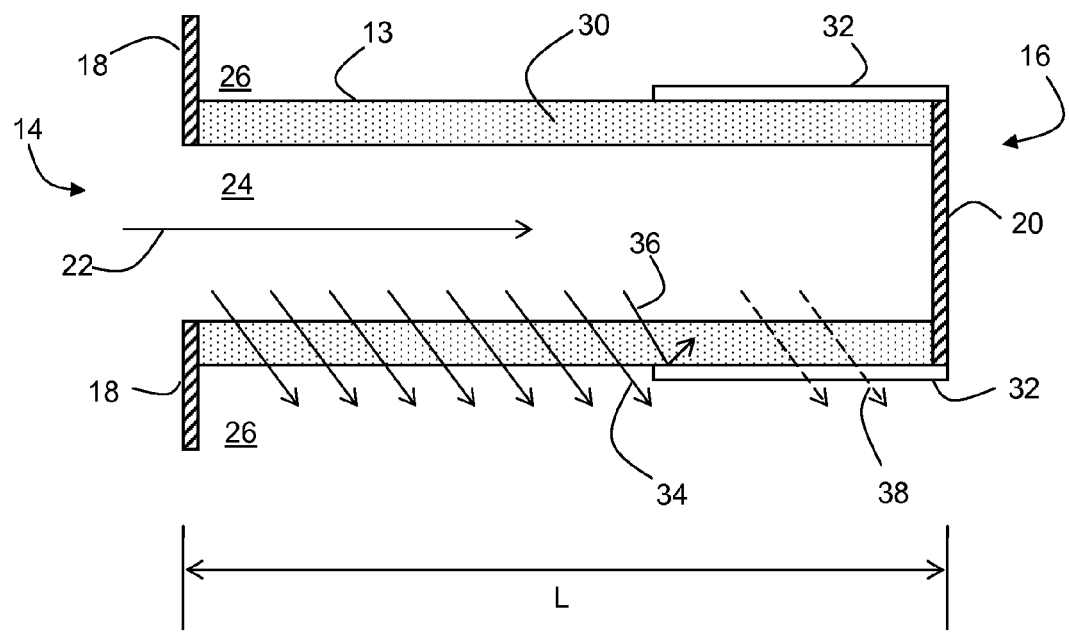
FIG. 3 shows a cutaway view of a section of a wall flow filter substrate according to one or more embodiment of the invention.

FIG. 3 illustrates a magnified view of a cross-section of an exemplary embodiment of the invention. The catalyst article shown comprises a wall flow filter having a plurality of longitudinally extending passages formed by longitudinally extending porous walls 13 bounding and defining the passages 24 and 26 and an axial length 'L' extending between an inlet end 14 and an outlet end 16. In some detailed embodiments, the porous walls have substantially uniform porosity throughout. The passages 24 and 26 comprise inlet passages 24 which are open at the inlet end 14 and closed at the outlet end 16, and outlet passages 26 which are closed at the inlet end 14 and open at the outlet end 16. An SCR catalyst composition 30 is disposed within the porous walls 13. An oxidation catalyst 32 is disposed on the walls 13 of the outlet passages 26 extending from the outlet end 16 for less than the axial length 'L' of the wall flow filter. According to one or more embodiments, it will be appreciated that the oxidation catalyst 32 is on the walls as opposed to permeating the walls, however, a portion of the oxidation catalyst may penetrate the wall, but the majority of the oxidation catalyst 32 is on or upon the wall, not embedded in the wall.

An exhaust gas stream 22 enters the inlet passages 24 and flows toward the outlet end 16 of the wall flow filter. The gas can take multiple paths through the filter, including passing through 34 the porous walls 13 from the inlet passages to the outlet passages 26 where it can exit the via the outlet end 16 of the filter. In flow path 36, the gas enters the porous wall 13 but is prevented from exiting the wall due to the presence of the oxidation catalyst 32, or some other material which renders the wall impermeable. Another alternative pathway 38, some of the exhaust gas 22 can diffuse through the porous wall 13 containing the SCR catalyst 30 and through the oxidation catalyst 32. This diffusion may occur even if the oxidation catalyst, or some additional layer, renders this region substantially gas impermeable.

The SCR catalyst 30 can be disposed within all or some of the porous walls 13. In detailed embodiments, the SCR catalyst 30 substantially uniformly permeates the porous walls 13. In specific embodiments, the SCR catalyst composition extends the entire axial length of the filter. In detailed embodiments, the SCR catalyst composition 30 extends through at least about 10% of the axial length of the filter. In other detailed embodiments, the SCR catalyst composition 30 extends at least about 20%, 30%, 40%, 50%, 60%, 70%, 80% or 90% of the axial length of the filter.

In some embodiments, the catalyst article further comprises a gas impermeable zone starting at the outlet end and extending partially along the axial length of the wall flow filter. The term impermeable zone is defined to mean an area of the filter wall where the gas flow encounters a much higher resistance and thus, under normal flow conditions, the gas flow in much lower, less than a factor of two and more specifically, less by a factor of 5 or 10. In some detailed embodiments, the gas impermeable zone is formed by the oxidation catalyst. In additional detailed embodiments, the gas impermeable zone is formed from a material which does not react with exhaust gas components. In further detailed embodiments, the gas impermeable zone can be a material which does not function as an oxidation catalyst, but does react with gaseous species. Alternatively, the gas impermeable zone can be made from a combination of oxidation catalyst, inert materials and/or materials having different reactivity. In a specific embodiment, the gas impermeable zone is formed from a composition which includes alumina and a platinum group metal.

In additional embodiments, the gas impermeable zone extends up to about 70% of the axial length of the wall flow filter. The gas impermeable zone of some detailed embodiments begins at the outlet end of the filter and extends toward the inlet end. In detailed embodiments, the gas impermeable zone extends up to about 60%, 50%, 40%, 30%, 20% and 10% of the axial length of the wall flow filter. In some embodiments, the oxidation catalyst is disposed substantially only on the walls of the outlet passages in the gas impermeable zone. Where the gas impermeable zone is created by a composition other than the oxidation catalyst, the oxidation catalyst can cover all or less than all of the impermeable composition. Additionally, the oxidation catalyst could cover a longer axial length that of the gas impermeable composition.

According to some specific embodiments, the catalyst article is effective to remove at least about 50%, 60%, 70%, 80% or 90% of the soot from the exhaust stream. In other specific embodiments, the catalyst article is effective to remove greater than about 80%, 85%, 90%, 95% or substantially all of the carbon monoxide, hydrocarbons, nitrogen oxides and soot from an exhaust gas stream from a diesel engine.

Further embodiments of the invention are directed to catalysts articles for treating an exhaust stream comprising CO, hydrocarbons, NOx and soot. The catalyst articles comprise a wall flow filter having an axial length including a first region extending the entire axial length and a second region extending less than the axial length. The first region is effective to remove substantially all of the NOx in the exhaust stream and the second region is effective to oxidize one or more of the CO, hydrocarbons and soot.

Figure 4:
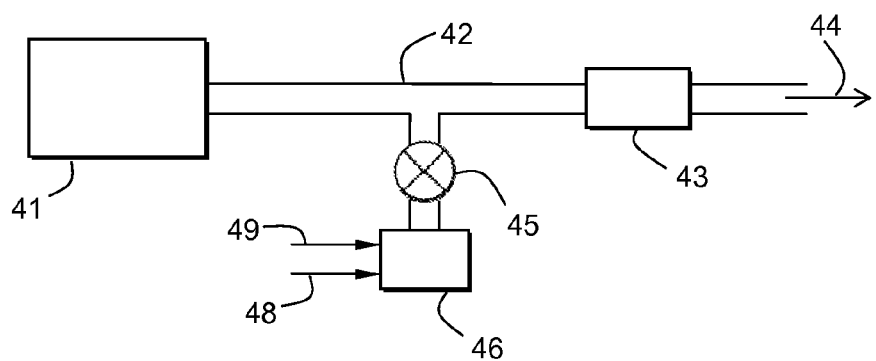
FIG. 4 shows an embodiment of the emission treatment system of the invention that includes a urea injector.

Additional embodiments of the invention are directed to systems for treating exhaust from a lean burn diesel engine. The systems comprise the four-way catalyst article previously described located downstream of the engine. One embodiment of the inventive emission treatment system is schematically depicted in FIG. 4. As can be seen in FIG. 4, the exhaust containing gaseous pollutants (including unburned hydrocarbons, carbon monoxide and NOx) and particulate matter is conveyed from the engine 41 through a connector 42 to a four-way catalyst 43, as previously described. After the four-way catalyst 43, the exhaust gas exits the system via the tailpipe 44. The connector 42 may not be required when no additional components are used before the four-way catalyst 43. In these embodiments, the four-way catalyst 43 is coupled directed to the engine 41. The distance between the engine and four-way catalyst can be quite short resulting in a so called "close coupled" catalytic arrangement. Alternatively, the distance from the engine to the catalyst can be longer, resulting in an "underfloor" configuration.

In detailed embodiments, the emission treatment system further comprises a urea injector located upstream of the catalyst, as shown in FIG. 4. Downstream of the oxidation catalyst a reductant, in this case urea, is injected as a spray via a nozzle (not shown) into the exhaust stream. Aqueous urea shown on one line 48 can serve as the ammonia precursor which can be mixed with air on another line 49 in a mixing station 46. Valve 45 can be used to meter precise amounts of aqueous urea which are converted in the exhaust stream to ammonia. The exhaust stream with the added ammonia is conveyed to the four-way catalyst component 43.

In the exemplary embodiment of FIG. 4, the emission treatment system includes a single four-way catalyst article 43, as previously described. The system may include other components, such as the urea injector, but only a single catalyst component 43.

Figure 5:
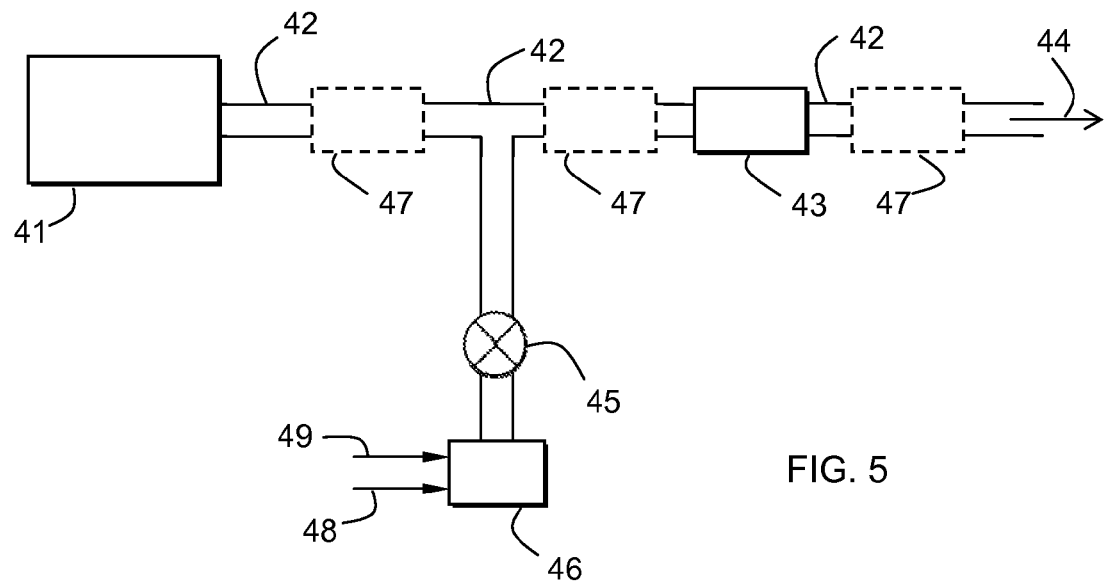
FIG. 5 shows an embodiment of the emission treatment system of the invention that includes a urea injector and optional engine components.

As shown in FIG. 5, some embodiments of the treatment system include one or more separate optional components 47. These optional components 47 can include one or more of a diesel oxidation catalyst, ammonia oxidation catalyst, reductant injector, air injector, catalytic partial oxidation catalyst, particulate filter and selective catalyst reduction catalysts. Depending on the desired level of NOx removal, additional SCR catalyst can be disposed upstream or downstream of the four-way catalyst 43. For example, the additional SCR catalyst may be disposed on a monolithic, honeycomb flow through substrate or ceramic foam substrate downstream of the soot filter. Even in these embodiments, the use of the coated SCR soot filter still achieves a reduction in the total volume of catalyst required to meet NOx reduction goals. Depending on the desired level of hydrocarbon removal, additional oxidation catalysts can be disposed upstream or downstream of the four way catalyst 43.

The particulate matter including the soot fraction and the VOF are also largely removed (greater than 80%) by the soot filter. The particulate matter deposited on the soot filter is combusted through the regeneration of the filter, which process is also aided by the presence of the SCR catalyst composition. The temperature at which the soot fraction of the particulate matter combusts is lowered by the presence of the catalyst composition disposed on the soot filter. Additionally, the temperature at which the soot is removed is lowered by the presence of $NO_2$ in the exhaust stream which is effective for soot oxidation at lower temperatures than atomic oxygen.

One or more embodiments of the invention are directed to methods of treating a lean burn diesel exhaust gas stream including CO, hydrocarbons, NOx and soot. The method comprises passing the exhaust gas stream through a four-way catalyst article as previously described. In a detailed embodiment, urea is injected into the gas stream prior to passing the stream through the four-way catalyst article. In alternative and method system embodiments, other suitable reductants can be supplied to catalyze an SCR reaction. Such reductants can include hydrocarbons, either supplied from the exhaust gas or injected into the exhaust stream separately, such as diesel fuel.

SCR Catalyst

Suitable SCR catalyst compositions for use in the system are able to effectively catalyze the reduction of the NOx component at temperatures below 600° C., so that adequate NOx levels can be treated even under conditions of low load which typically are associated with lower exhaust temperatures. In specific embodiments, SCR catalyst is chosen to provide a system $NO_x$ conversion of at least about 25% at 250° C. and a space velocity of about 80,000 $h^{-1}$. In specific embodiments, the SCR catalyst is chosen to provide a system $NO_x$ conversion of at least about 50% under these same conditions. In addition, SCR catalyst compositions for use in the system according to certain embodiments are able to aid in the regeneration of the filter by lowering the temperature at which the soot fraction of the particulate matter is combusted. Another desirable attribute for the composition is that it possesses the ability to catalyze the reaction of $O_2$ with any excess $NH_3$ to $N_2$ and $H_2O$, so that $NH_3$ is not emitted to the atmosphere.

Useful SCR catalyst compositions used in the inventive system also have thermal resistance to temperatures greater than 650° C. Such high temperatures are often encountered during the regeneration of soot filters. Additionally, according to one or more embodiments, SCR catalyst compositions should resist degradation upon exposure to sulfur components, which are often present in diesel exhaust gas compositions.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 0.5 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Zeolites used in such compositions are resistant to sulfur poisoning, sustain a high level of activity for the SCR process, and are capable of oxidation of excess ammonia with oxygen. These zeolites have pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant NOx and $NH_3$ molecules and reactant $NH_3$ and $O_2$ molecules. Any zeolites meeting the foregoing criteria are suitable for use in the practices of one or more embodiments the present invention; specific zeolites which meet these criteria are USY, Beta and ZSM-20. Other zeolites may also satisfy the aforementioned criteria.

When deposited on the wall flow filter substrates, such SCR catalyst compositions are deposited at a concentration of at least 0.8 $g/in^3$ to ensure that the desired NOx reduction and particulate removal levels are achieved and to secure adequate durability of the catalyst over extended use. In a detailed embodiment, there is at least 1.0 g/in³ of SCR composition, and in particular, 1.0 to 2.0 g/in³, disposed on the wall flow filter.

Substrates

Wall flow substrates suitable for use with embodiments of the invention have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 400 or more flow passages (or "cells") per square inch of cross section, although far fewer may be used. For example, the carrier may have from about 100 to 400, more usually from about 200 to 300, cells per square inch ("cpsi"). The cells can have cross sections that are rectangular, square, circular, or are of other polygonal shapes. Wall flow substrates typically have a wall thickness between 0.01 and 0.03 inches. Specific wall flow substrates have a wall thickness of between 0.012 and 0.015 inches.

Some suitable wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Particularly useful wall flow substrates include materials formed from cordierite and silicon carbide. Such materials are able to withstand the environment, particularly high temperatures, encountered in treating the exhaust streams.

Other suitable wall flow substrates for use in the inventive system include thin porous walled honeycombs (monolith)s through which the fluid stream passes without causing too great an increase in back pressure or pressure across the article. Ceramic wall flow substrates used in the system are in specific embodiments formed of a material having a porosity of at least 50% (e.g., from 50 to 85%) having a mean pore size of at least 5 microns (e.g., from 5 to 30 microns). In more specific embodiments, the substrates have a porosity of at least 55% and have a mean pore size of at least 15 microns. When substrates with these porosities and these mean pore sizes are coated with the techniques described below, adequate levels of SCR catalyst compositions can be loaded onto the substrates to achieve excellent NOx conversion efficiency. These substrates are still able retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are typically formed with lower wall porosities, e.g., from about 35% to 50%, than the wall flow filters utilized in embodiments of the invention. In general, the pore size distribution of commercial wall flow filters is typically very broad with a mean pore size smaller than 17 microns.

To coat the wall flow substrates with the SCR catalyst composition, the substrates are immersed vertically in a portion of a catalyst slurry of solid particles in a liquid such that the top of the substrate is located just above the surface of the slurry. The sample is left in the slurry for about 30 seconds. The substrate is removed from the slurry, and excess slurry is removed from the wall flow substrate first by allowing it to drain from the channels, then by blowing with compressed air (against the direction of slurry penetration). By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300° to 450° C.). After calcining, the catalyst loading can determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Urea Injector

A urea injector, also referred to as a reductant dosing system, may be provided upstream of the four-way catalyst to inject a NOx reductant into the exhaust stream. As disclosed in U.S. Pat. No. 4,963,332, NOx upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

This invention is not limited to the aqueous urea metering arrangement shown in FIG. 4. It is contemplated that a gaseous nitrogen based reagent will be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) and urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO to produce ammonia.

In addition to urea and cyanuric acid, other nitrogen based reducing reagents or reductants especially suitable for use in the control system according to embodiments of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc. In addition, hydrocarbon reductant can be a sufficient quantity of hydrocarbons to catalyze an SCR reaction. The hydrocarbon reductant can be from a separate supply, or it can be part of the exhaust gas flowing through the catalytic component in which the SCR reaction occurs.

Oxidation Catalyst

The oxidation catalyst can be formed from any composition that provides effective combustion of unburned gaseous and non-volatile hydrocarbons (i.e., the VOF) and carbon monoxide. One specific oxidation catalyst composition that may be used in the emission treatment system contains a platinum group component (e.g., platinum, palladium or rhodium components) dispersed on a high surface area, refractory oxide support (e.g., γ-alumina) which can be combined with a zeolite component (for example, a beta zeolite). In specific embodiments, the platinum group metal component is platinum. When the composition is disposed on a refractory oxide substrate, e.g., a flow through honeycomb substrate, the concentration of platinum is typically from about 10 to 120 g/ft$^3$ of platinum.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and more specifically about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 m$^2$/g and consist essentially of a bulk second metal oxide which may be one or more of titania, zirconia, ceria-zirconia, silica, alumina-silica, and α-alumina.

Also useful are the catalyst compositions disclosed in U.S. Pat. No. 5,462,907 (the '907 patent, the disclosure of which is hereby incorporated by reference). The '907 patent teaches compositions that include a catalytic material containing ceria and alumina each having a surface area of at least about 10 m$^2$/g, for example, ceria and activated alumina in a weight ratio of from about 1.5:1 to 1:1.5. Optionally, platinum may be included in the compositions described in the '907 patent in amounts effective to promote gas phase oxidation of CO and unburned hydrocarbons but which are limited to preclude excessive oxidation of SO to $SO_2$. Alternatively, palladium in any desired amount may be included in the catalytic material.

The following examples further illustrate the present invention, but of course, should not be construed as in any way limiting its scope.

EXAMPLE 1

Synthesis of a Sample of a Four-Way Catalyst with Pd Alumina on SCR on Filter

A cordierite wall flow filter sample, 1" diameter by 3" long, plugged and skinned, with a wall porosity of approximately 65%, was coated with SCR catalyst. The catalyst was a Cu CHA zeolite and was loaded into the walls of the filter by immersing in a slurry of the zeolite mixed with water for 30 seconds, removing and draining followed by blowing the remaining slurry out of the filter with compressed air. The catalytically loaded filter was dried and calcined at 450° C. for 1 hr. The resulting catalyst loading was 1.3 g/in$^3$. A second slurry was made containing using Pd nitrate dispersed on high surface area alumina. The slurry was diluted with DI water to approximately 23% solids and the SCR loaded filter was then coated with the Pd alumina slurry by dipping the filter from the outlet end to a distance of 1". The slurry was drained from the outlet end and the remaining excess material was blow out of the filter from the inlet end using compressed air. The resulting Pd loading was 10 g/ft$^3$ (/ft$^3$ of zone). The filter was again dried and calcined at 450° C. for 1 h.

EXAMPLE 2

Comparative Example, Synthesis of SCR on Filter without Oxidative Zone Coating

Using the coating techniques outlined in Example 1, a cordierite wall flow filter, 1" long by 3" in diameter, plugged and skinned with a wall porosity of approximately 59% was coated with SCR catalyst. The catalyst was a Cu CHA zeolite and was loaded to 1.14 g/in$^3$. After calcination at 450° C., no further coating or processing was performed.

EXAMPLE 3

Reactor Testing of the Four-Way Catalyst

The sample prepared in Example 1 was reactor tested for simultaneous SCR and oxidation activity by feeding a reaction gas of the following mixture: NO and $NH_3$ at 500 ppm each, $C_3H_6$ at 50 ppm, CO at 100 ppm, $CO_2$ at 8%, $H_2O$ at 5% and the balance $N_2$. The gas flow was from the inlet side to the outlet side as coated. The space velocity in the filter core was 17,500 hr$^{-1}$. The sample was tested at temperatures between 200 and 450° C. by ramping to each test temperature under gas flow and equilibrating for at least 15 minutes before taking FTIR measurements of outlet concentrations of the inlet gases as well as $N_2O$ and $NO_2$. Table 1 shows the outlet concentrations as measured as well as the calculated conversions.

TABLE 1

Four-way catalyst reactor test results.

| Temp (° C.) | NO ppm | NO conv. | $NH_3$ ppm | $NH_3$ conv. | CO ppm | CO conv. | $C_3H_6$ ppm | $C_3H_6$ conv. | $NO_2$ ppm | $N_2O$ ppm |
|---|---|---|---|---|---|---|---|---|---|---|
| 200 | 42 | 91.6 | 56 | 88.8 | 12 | 88 | 40 | 20 | 0 | 19 |
| 250 | 13 | 97.4 | 23 | 95.4 | 3 | 97 | 2 | 96 | 0 | 13 |
| 300 | 37 | 92.6 | 10 | 98.0 | 1 | 99 | 0 | 100 | 1 | 8 |
| 350 | 56 | 88.8 | 7 | 98.6 | 0 | 100 | 0 | 100 | 8 | 7 |
| 450 | 81 | 83.8 | 7 | 98.6 | 0 | 100 | 0 | 100 | 33 | 7 |

The reactor test results showed that the catalyst was able to convert the CO and $C_3H_6$ completely at 250° C. and at the same time convert the NO using $NH_3$ without producing excessive $NO_2$ or $N_2O$.

EXAMPLE 4

Reactor Testing of the Four-Way Catalyst Run in Reverse

Using the sample from Example 1 and the test protocol from Example 3, the four-way catalyst sample was run in reverse. Thus, the flow was from the outlet end to the inlet end. Table 2 shows the outlet concentrations (measured at the inlet end for this Example) and the calculated conversions for the reversed flow configuration.

TABLE 2

Reactor test results of four-way catalyst run in reverse.

| Temp | NO | | $NH_3$ | | CO | | $C_3H_6$ | | $NO_2$ | $N_2O$ |
|---|---|---|---|---|---|---|---|---|---|---|
| (° C.) | ppm | conv. | ppm | conv. | ppm | conv. | ppm | conv. | ppm | ppm |
| 200 | 41 | 91.8 | 25 | 95 | 50 | 50 | 53 | −6 | 0 | 11 |
| 250 | 0 | 100 | 16 | 96.8 | 17 | 83 | 30 | 40 | 0 | 11 |
| 300 | 235 | 53 | 7 | 98.6 | 0 | 100 | 0 | 100 | 15 | 56 |
| 350 | 378 | 24.4 | 7 | 98.6 | 0 | 100 | 0 | 100 | 62 | 40 |
| 450 | 341 | 31.8 | 6 | 98.8 | 0 | 100 | 0 | 100 | 127 | 67 |

The data in Table 2 showed that when operated in the reverse configuration, the sample did not convert all of the NO above 300° C., even though the $NH_3$ conversion was complete. Additionally, the $N_2O$ and $NO_2$ production above 300° C. was much higher. Thus as an SCR catalyst in the reverse flow direction, it was clearly inferior. The CO and $C_3H_6$ conversions were quantitative at temperatures above 300° C. but the light-off temperature was higher than in the normal flow direction and thus it was an inferior oxidation catalyst as well in the reversed flow configuration.

EXAMPLE 5

Reactor Testing of Comparative SCR on Filter Catalyst

Using the comparative SCR only sample from Example 2 and the reactor protocol from Example 3, a test was performed of the combined SCR and oxidation catalytic behavior. Table 3 shows the outlet concentrations as well as the calculated conversions.

TABLE 3

Comparative example reactor test results.

| Temp | NO | | $NH_3$ | | CO | | $C_3H_6$ | | $NO_2$ | $N_2O$ |
|---|---|---|---|---|---|---|---|---|---|---|
| (° C.) | ppm | conv. | ppm | conv. | ppm | conv. | ppm | conv. | ppm | ppm |
| 200 | 161 | 67.8 | 141 | 71.8 | 97 | 3 | 50 | 0 | 3 | 13 |
| 250 | 25 | 95 | 25 | 95 | 98 | 2 | 38 | 24 | 0 | 14 |
| 300 | 13 | 97.4 | 13 | 97.4 | 109 | −9 | 12 | 76 | 0 | 12 |
| 350 | 37 | 92.6 | 4 | 99.2 | 87 | 13 | 3 | 94 | 0 | 13 |
| 450 | 134 | 73.2 | 2 | 99.6 | 27 | 73 | 0 | 100 | 26 | 19 |

The SCR catalyst performed well with respect to converting the NO without producing too much $N_2O$ or $NO_2$. However, the CO conversion was quite low, as is the $C_3H_6$ conversion below 350° C. Thus the SCR catalyst by itself was not adequate as a four-way catalyst due to insufficient oxidative capability.

While this invention has been described with an emphasis upon detailed, specific and preferred embodiments, it will be obvious to those of ordinary skill in the art that variations in the devices and methods may be used and that it is intended that the invention may be practiced otherwise than as specifically described herein. Accordingly, this invention includes all modifications encompassed within the spirit and scope of the invention as defined by the claims that follow.

What is claimed:

1. A catalyst article comprising a wall flow filter having a plurality of longitudinally extending passages formed by longitudinally extending porous walls bounding and defining the passages and an axial length extending between an inlet end and an outlet end wherein the passages comprise inlet passages open at the inlet end and closed at the outlet end, and outlet passages being closed at the inlet end and open at the outlet end, an SCR catalyst composition disposed within and permeating the porous walls and an oxidation catalyst disposed on the walls of the outlet passages extending from the outlet end and less than the axial length of the wall flow filter.

2. The catalyst article of claim 1, further comprising a gas impermeable zone starting at the outlet end and extending partially along the axial length of the wall flow filter.

3. The catalyst article of claim 2, wherein the gas impermeable zone is formed by the oxidation catalyst.

4. The catalyst article of claim 2, wherein the gas impermeable zone is formed from a material which does not react with exhaust gas components.

5. The catalyst article of claim 2, wherein the gas impermeable zone is formed from a composition comprising alumina and a platinum group metal.

6. The catalyst article of claim 2, wherein the oxidation catalyst is disposed substantially only on the walls of the outlet passages in the gas impermeable zone.

7. The catalyst article of claim 2, wherein the gas impermeable zone extends up to about 70% of the axial length of the wall flow filter.

8. The catalyst article of claim 2, wherein the gas impermeable zone extends up to about 50% of the axial length of the wall flow filter.

9. The catalyst article of claim 2, wherein the gas impermeable zone extends up to about 30% of the axial length of the wall flow filter.

10. The catalyst article of claim 2, wherein the gas impermeable zone extends up to about 10% of the axial length of the wall flow filter.

11. The catalyst article of claim 1, wherein the SCR catalyst composition extends the entire axial length of the filter.

12. The catalyst article of claim 1, wherein the porous walls have substantially uniform porosity.

13. The catalyst article of claim 1, wherein the SCR catalyst uniformly permeates the porous walls.

14. The catalyst article of claim 1, wherein at least about 70% of soot in the exhaust stream is removed from the exhaust gas stream.

15. The catalyst article of claim 1, wherein the article is effective to remove carbon monoxide, hydrocarbons, nitrogen oxides and soot from an exhaust gas stream from a diesel engine.

16. The catalyst article of claim 1, wherein the oxidation catalyst comprises a platinum group metal component dispersed on a refractory oxide support and the SCR catalyst composition comprises a promoter metal and a zeolite.

17. The catalyst article of claim 1, wherein the oxidation catalyst comprises a platinum group metal component dispersed on a refractory oxide support and the SCR catalyst is effective to catalyze the reduction of NOx at temperatures below 600° C. such s between 200 and 450° C. in the presence of a reductant.

18. A system for treating exhaust from a lean burn diesel engine comprising the catalyst article of claim 1 located downstream of the engine.

19. The system of claim 18, wherein the catalyst article further comprises a gas impermeable zone starting from the outlet end and extending partially along the axial length of the wall flow filter.

20. The system of claim 19, further comprising a urea injector located upstream of the catalyst.

21. The system of claim 20, further comprising a hydrocarbon source located upstream of the catalyst.

22. The system of claim 21, further comprising a DOC located upstream of the urea injector.

23. A method of treating a lean burn diesel exhaust gas stream including CO, hydrocarbons, NOx and soot comprising flowing exhaust from a diesel engine through a wall flow filter having a plurality of longitudinally extending passages formed by longitudinally extending porous walls bounding and defining the passages and an axial length extending between an inlet end and an outlet end wherein the passages comprise inlet passages open at the inlet end and closed at the outlet end, and outlet passages being closed at the inlet end and open at the outlet end, the exhaust gas stream contacting an SCR catalyst composition disposed within the porous walls and subsequently contacting the exhaust gas stream with an oxidation catalyst disposed on the walls of the outlet passages extending from the outlet end and less than the axial length of the wall flow filter.

24. The method of claim 23, wherein there is a gas impermeable zone extending from the outlet end along the axial length of the wall flow filter.

25. A catalyst article for treating an exhaust stream comprising CO, hydrocarbons, NOx and soot, the catalyst article comprising a wall flow filter having an inlet end, an outlet end and an axial length, the wall flow filter including a first region extending the entire axial length and a second region extending from the outlet end of the wall flow filter for less than the axial length, the first region effective to remove substantially all of the NOx in the exhaust stream and the second region effective to oxidize one or more of the CO, hydrocarbons and soot.

26. A method of treating an exhaust gas stream including CO, hydrocarbons, NOx and soot comprising passing the exhaust gas stream through a single catalytic article comprising a wall flow filter having an inlet end, an outlet end and an axial length, the wall flow filter including a first region extending the entire axial length that removes substantially all of the NOx in the exhaust stream and a second region extending from the outlet end of the wall flow filter less than the axial length for oxidizing one or more of CO, hydrocarbons or soot.

* * * * *